US008121490B2

(12) United States Patent
Sakata et al.

(10) Patent No.: US 8,121,490 B2
(45) Date of Patent: Feb. 21, 2012

(54) TRANSPONDER UNIT, TRANSPONDER UNIT CONTROL APPARATUS, TRANSPONDER UNIT CONTROL METHOD AND RECORDING MEDIUM RECORDING TRANSPONDER UNIT CONTROL PROGRAM

(75) Inventors: Tomoyuki Sakata, Fukuoka (JP); Yoshikazu Nakanishi, Fukuoka (JP); Haruki Tanaka, Fukuoka (JP); Kouichi Maeda, Fukuoka (JP); Takeshi Noma, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 868 days.

(21) Appl. No.: 12/046,184

(22) Filed: Mar. 11, 2008

(65) Prior Publication Data

US 2008/0232806 A1 Sep. 25, 2008

(30) Foreign Application Priority Data

Mar. 20, 2007 (JP) ................................ 2007-072195

(51) Int. Cl.
*H04B 10/00* (2006.01)
*H04J 3/06* (2006.01)
*H04L 7/04* (2006.01)

(52) U.S. Cl. ......................... 398/155; 370/503; 375/362

(58) Field of Classification Search .................. 398/155; 370/503; 375/362
See application file for complete search history.

(56) References Cited

U.S. PATENT DOCUMENTS

| | | | | |
|---|---|---|---|---|
| 5,963,608 | A * | 10/1999 | Casper et al. | 375/373 |
| 2008/0170852 | A1 * | 7/2008 | Santoro et al. | 398/15 |

FOREIGN PATENT DOCUMENTS

| | | |
|---|---|---|
| JP | 5-344020 | 12/1993 |
| JP | 2004-64585 | 2/2004 |

* cited by examiner

*Primary Examiner* — Nathan Curs
(74) *Attorney, Agent, or Firm* — Staas & Halsey LLP

(57) ABSTRACT

A transponder includes a CDR section that extracts clocks from an input signal, an oscillating section that can output various frequencies to the CDR section, a frequency instruction processing section that instructs the oscillating section to output an arbitrary frequency, a detection processing section, and a frame processing section control section. The detection processing section determines whether the frequency output from the oscillating section and an input signal synchronize in frequency or not in response to an instruction by the frequency instruction processing section, and detects a synchronization frequency. The frame processing section control section operates a frame processing section based on the synchronization frequency detected by the detection processing section.

8 Claims, 11 Drawing Sheets

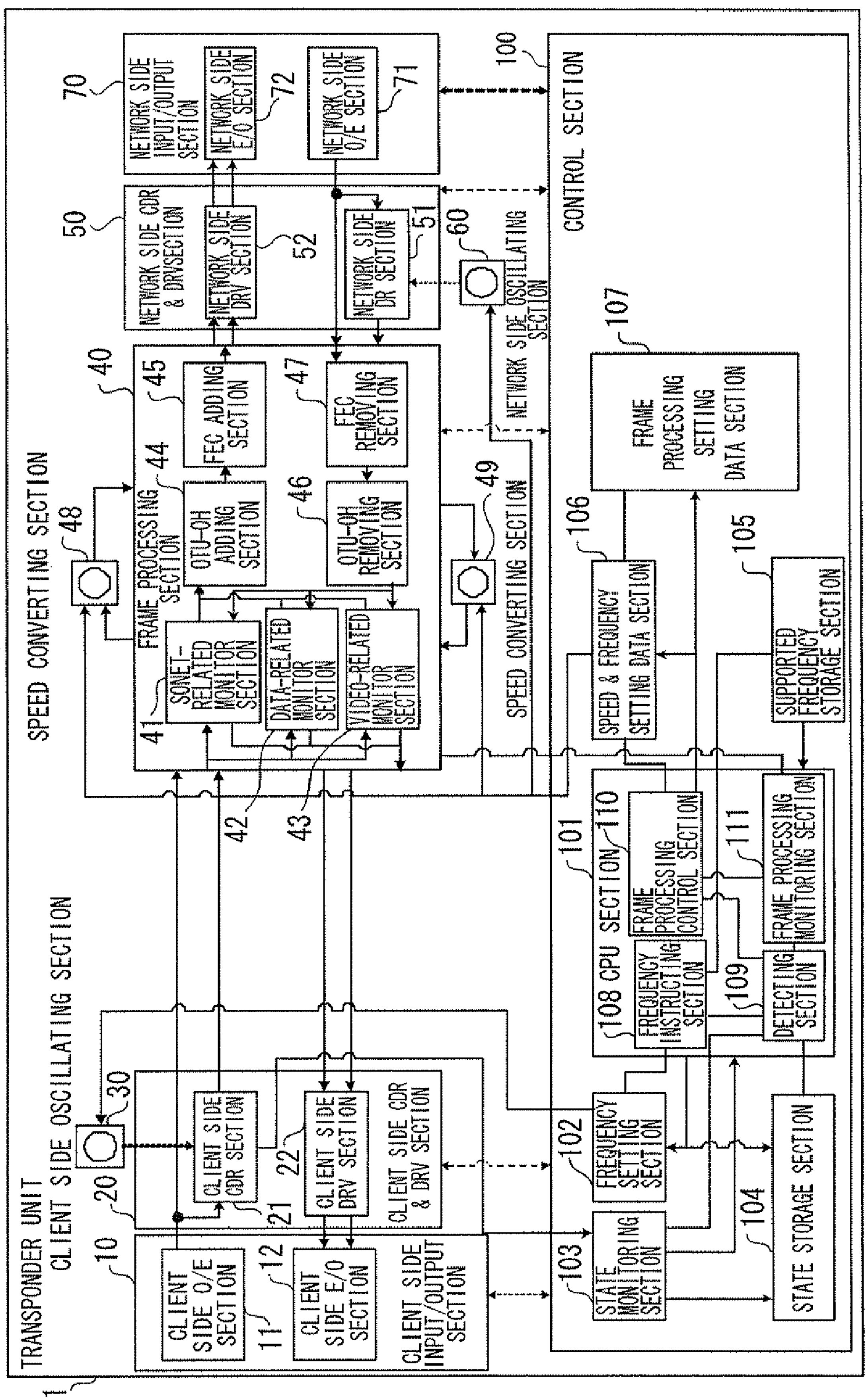
FIG. 2
TRANSPONDER UNIT
CLIENT SIDE OSCILLATING SECTION
SPEED CONVERTING SECTION
CLIENT SIDE O/E SECTION
CLIENT SIDE E/O SECTION
CLIENT SIDE INPUT/OUTPUT SECTION
CLIENT SIDE CDR SECTION
CLIENT SIDE DRV SECTION
CLIENT SIDE CDR & DRV SECTION
FRAME PROCESSING SECTION
SONET-RELATED MONITOR SECTION
DATA-RELATED MONITOR SECTION
VIDEO-RELATED MONITOR SECTION
OTU-OH ADDING SECTION
OTU-OH REMOVING SECTION
FEC ADDING SECTION
FEC REMOVING SECTION
NETWORK SIDE CDR & DRVSECTION
NETWORK SIDE DRV SECTION
NETWORK SIDE DR SECTION
NETWORK SIDE OSCILLATING SECTION
NETWORK SIDE INPUT/OUTPUT SECTION
NETWORK SIDE E/O SECTION
NETWORK SIDE O/E SECTION
CONTROL SECTION
FRAME PROCESSING SETTING DATA SECTION
SPEED & FREQUENCY SETTING DATA SECTION
SUPPORTED FREQUENCY STORAGE SECTION
CPU SECTION
FREQUENCY INSTRUCTING SECTION
FRAME PROCESSING CONTROL SECTION
DETECTING SECTION
FRAME PROCESSING MONITORING SECTION
FREQUENCY SETTING SECTION
STATE MONITORING SECTION
STATE STORAGE SECTION
1
10
11
12
20
21
22
30
40
41
42
43
44
45
46
47
48
49
50
51
52
60
70
71
72
100
101
102
103
104
105
106
107
108
109
110
111

FIG. 3

| OSCILLATOR SUPPORTING FREQUENCY TABLE | |
| --- | --- |
| HIGHEST FREQUENCY (MHz) | 2666.325 |
| LOWEST FREQUENCY (MHz) | 621.9866 |

FIG. 4

| REFERENCE FREQUENCY (MHz) IN OSCILLATING SECTION | CDR STATE | CENTER FREQUENCY | DEVIATION (ppm) FROM CENTER FREQUENCY | WIDTH OF FREQUENCY BAND |
|---|---|---|---|---|
| 2666.325 | Un-LOCK | - | 100.4104 | |
| 2666.325 | LOCK | 2666.058 | 100.3729 | LOCK WIDTH: ±100ppm |
| ... | ... | | ... | |
| 2666.057 | LOCK | | | |
| ... | ... | | | |
| 2665.79 | LOCK | | -100.035 | |
| 2665.79 | Un-LOCK | - | -100.073 | |
| ↓ | ↓ | ↓ | ↓ | ↓ |
| 622.1734 | Un-LOCK | - | 150.1415 | |
| 622.1733 | LOCK | 622.08 | 149.9807 | LOCK WIDTH: ±150ppm |
| ... | ... | | ... | |
| 622.0800 | LOCK | | | |
| ... | ... | | | |
| 621.9867 | LOCK | | -149.981 | |
| 621.9866 | Un-LOCK | - | -150.141 | |
| ↓ | ↓ | ↓ | ↓ | |

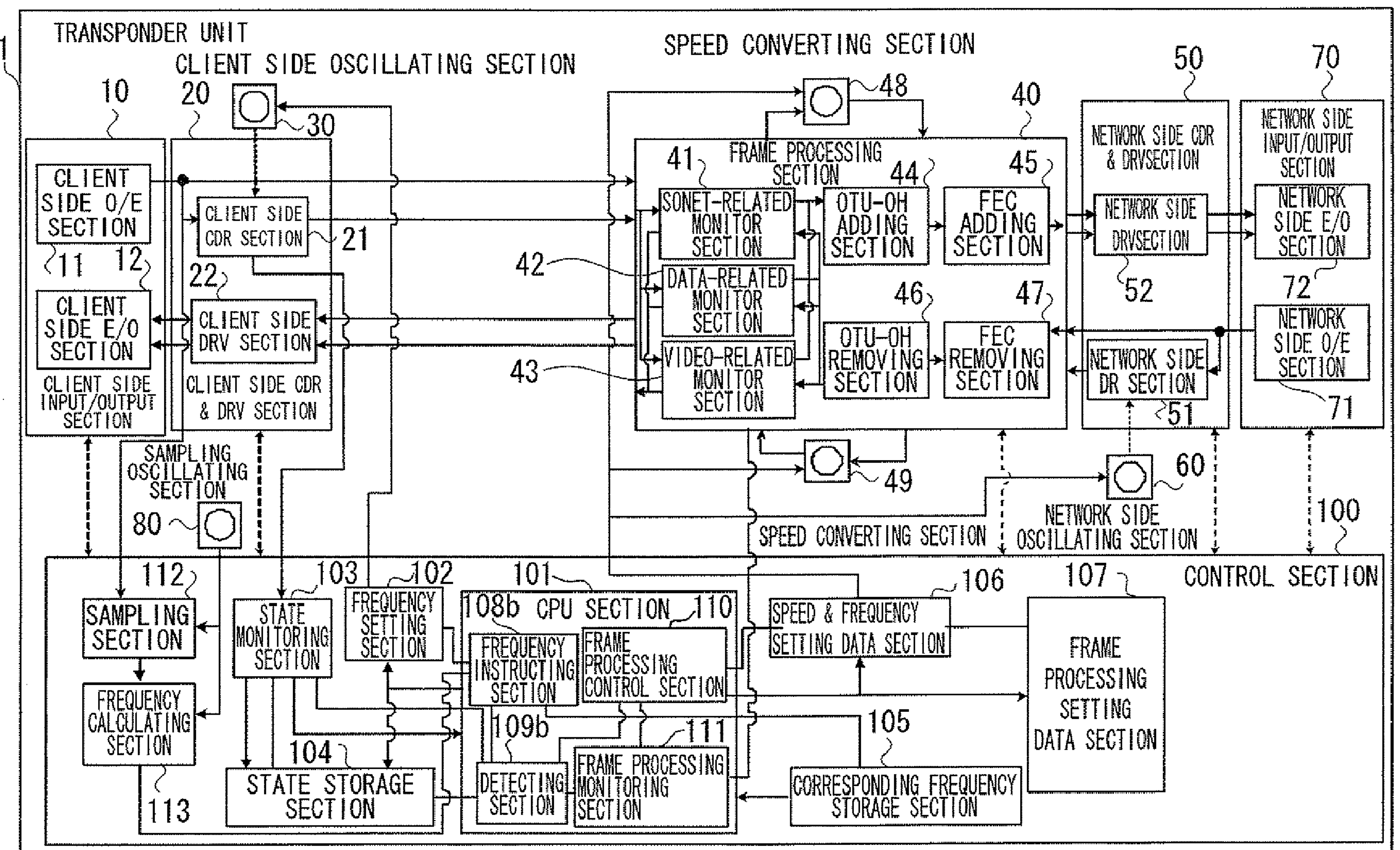
FIG. 6
1
TRANSPONDER UNIT
CLIENT SIDE OSCILLATING SECTION
SPEED CONVERTING SECTION
10
20
30
48
40
50
70
CLIENT SIDE O/E SECTION
11
12
CLIENT SIDE E/O SECTION
CLIENT SIDE INPUT/OUTPUT SECTION
CLIENT SIDE CDR SECTION
21
22
CLIENT SIDE DRV SECTION
CLIENT SIDE CDR & DRV SECTION
FRAME PROCESSING SECTION
41
SONET-RELATED MONITOR SECTION
42
DATA-RELATED MONITOR SECTION
43
VIDEO-RELATED MONITOR SECTION
44
OTU-OH ADDING SECTION
45
FEC ADDING SECTION
46
OTU-OH REMOVING SECTION
47
FEC REMOVING SECTION
NETWORK SIDE CDR & DRVSECTION
NETWORK SIDE DRVSECTION
52
NETWORK SIDE DR SECTION
51
NETWORK SIDE INPUT/OUTPUT SECTION
NETWORK SIDE E/O SECTION
72
NETWORK SIDE O/E SECTION
71
49
60
SAMPLING OSCILLATING SECTION
80
SPEED CONVERTING SECTION
NETWORK SIDE OSCILLATING SECTION
100
CONTROL SECTION
112
SAMPLING SECTION
FREQUENCY CALCULATING SECTION
113
103
STATE MONITORING SECTION
102
FREQUENCY SETTING SECTION
104
STATE STORAGE SECTION
101
108b CPU SECTION
110
FREQUENCY INSTRUCTING SECTION
FRAME PROCESSING CONTROL SECTION
109b
DETECTING SECTION
111
FRAME PROCESSING MONITORING SECTION
106
SPEED & FREQUENCY SETTING DATA SECTION
105
CORRESPONDING FREQUENCY STORAGE SECTION
107
FRAME PROCESSING SETTING DATA SECTION (1) SAMPLE INPUT SIGNALS
(ex: 0, 0, 1, 1, 1, 1, 1, 1, …)

(2) IDENTIFY POINT OF CHANGE (3) CALCULATE POINT-OF-CHANGE CYCLE FREQUENCY FROM THE SAMPLING RESULT, SAMPLING FREQUENCY AND POINT OF CHANGE
(EX: THE INPUT SIGNAL IS AT 2 GHZ/16 = 0.125 GHZ
125 MHZ BECAUSE THE FREQUENCY DIVISION RATE IS 1/16 IN A CASE WHERE THE SAMPLE FREQUENCY IS 2 GHZ IN FIG. 7C

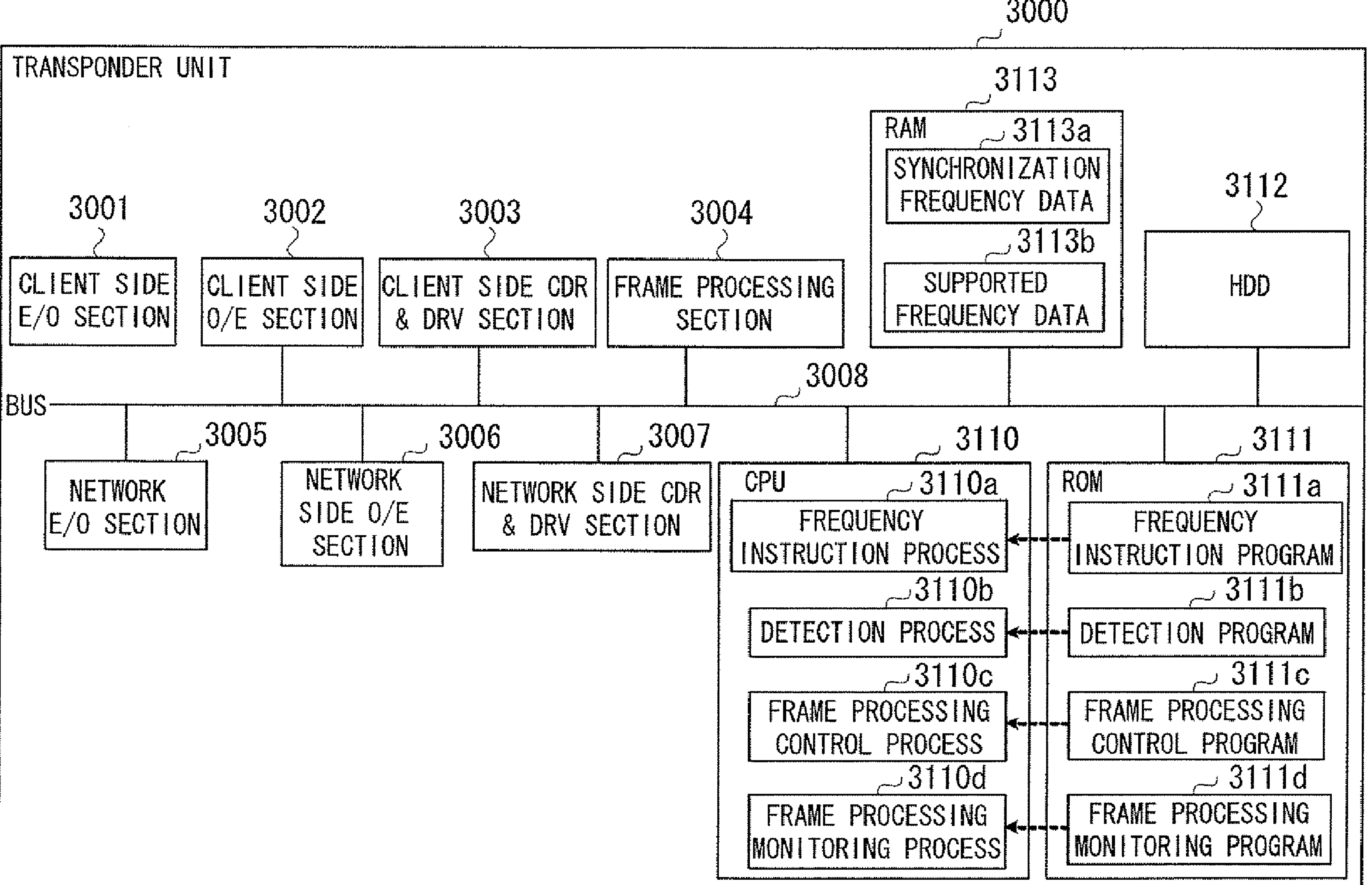
FIG. 10
3000
TRANSPONDER UNIT
3001
CLIENT SIDE E/O SECTION
3002
CLIENT SIDE O/E SECTION
3003
CLIENT SIDE CDR & DRV SECTION
3004
FRAME PROCESSING SECTION
3113
RAM
3113a
SYNCHRONIZATION FREQUENCY DATA
3113b
SUPPORTED FREQUENCY DATA
3112
HDD
BUS
3008
3005
NETWORK E/O SECTION
3006
NETWORK SIDE O/E SECTION
3007
NETWORK SIDE CDR & DRV SECTION
3110
CPU
3110a
FREQUENCY INSTRUCTION PROCESS
3110b
DETECTION PROCESS
3110c
FRAME PROCESSING CONTROL PROCESS
3110d
FRAME PROCESSING MONITORING PROCESS
3111
ROM
3111a
FREQUENCY INSTRUCTION PROGRAM
3111b
DETECTION PROGRAM
3111c
FRAME PROCESSING CONTROL PROGRAM
3111d
FRAME PROCESSING MONITORING PROGRAM

TRANSPONDER UNIT, TRANSPONDER UNIT CONTROL APPARATUS, TRANSPONDER UNIT CONTROL METHOD AND RECORDING MEDIUM RECORDING TRANSPONDER UNIT CONTROL PROGRAM

BACKGROUND OF THE INVENTION

1. Field of the Invention

Embodiments herein relate to a transponder unit, a transponder unit control apparatus, a transponder unit control method and a recording medium recording a transponder unit control program.

2. Description of the Related Art

WDM (Wavelength Division Multiplexing) is used commonly in the optical communication network field to increase the transmission capability of an optical fiber line. A WDM system applies the characteristic that optical signals with different wavelengths do not interfere with each other. A WDM system transmits multiple optical signals with different wavelengths through a number of transponder units equal to the number of wavelengths to be multiplexed.

A wide variety of client data protocols has appeared in recent years for use in optical communication in the WDM system. The client data protocols mainly use transponders applicable to various data protocol rather than a transponder only applicable to a specific data protocol. For example, SONET/SDH was predominate in existing systems while transponders which are compliant with data-related data protocols such as Giga Bit Ethernet (registered trademark) (GbE) or video-related data protocols such as DV6000 have become predominate.

Here, in a conventional WDM system, all transponders (such as a transponder unit A, a transponder unit B and a transponder unit C in FIG. 11) must define data protocols to be supported (or used). The definition is mainly performed manually (refer to (1) and (2) in FIG. 11).

JP-A-2004-64585, for example, discloses a technology including, in SDH line terminal equipment, identifying a line type of a received frame and processing the received frame by using setting data corresponding to the identified line type. More specifically, the SDH line terminal equipment stores setting data corresponding to the line type of the SDH line. Then, upon reception of a frame, the format of the received frame is identified, and the line type is thus identified. Then, the received frame is processed based on the setting data corresponding to the identified line type.

SUMMARY OF THE INVENTION

According to an aspect of an embodiment, a transponder unit comprises:

a CDR (Clock Data Recovery) section that extracts clocks from an input signal, and an oscillating section that can output various frequencies to the CDR section;

a frequency instruction processing section that instructs the oscillating section to output an arbitrary frequency;

a detection processing section that determines whether the frequency output from the oscillating section and an input signal synchronize in frequency or not in response to an instruction by the frequency instruction processing section, and detects a synchronization frequency; and a frame processing section control section that operates a frame processing section based on the synchronization frequency detected by the detection processing section.

According to still another aspect of an embodiment, a transponder unit control apparatus comprises:

a transponder unit having a CDR section that extracts clocks from an input signal, and an oscillating section that can output various frequencies to the CDR section, a frequency instruction processing section that instructs the oscillating section to output an arbitrary frequency, a detection processing section that determines whether the frequency output from the oscillating section and an input signal synchronize in frequency or not in response to an instruction by the frequency instruction processing section, and detects a synchronization frequency, and a frame processing section control section that operates a frame processing section based on the synchronization frequency detected by the detection processing section; and a control section that controls the transponder unit.

According to still another aspect of an embodiment, a transponder unit control method comprises:

extracting clocks from an input signal;

outputting an arbitrary frequency;

determining whether the frequency and the input signal synchronize in frequency or not and detecting a synchronization frequency; and processing a frame section on the synchronization frequency.

According to still another aspect of an embodiment, a recording medium recording a transponder unit control program causes a computer to perform:

causing a CDR section to extract clocks from an input signal;

instructing to an oscillating section output an arbitrary frequency from;

determining whether the frequency output from the oscillating section and the input signal synchronize in frequency or not in response to the instruction, and detecting a synchronization frequency; and operating a frame processing section based on the synchronization frequency detected by the detection.

The above-described embodiments of the present invention are intended as examples, and all embodiments of the present invention are not limited to including the features described above.

BRIEF DESCRIPTION OF THE DRAWINGS

FIG. 2 is a block diagram showing a configuration of the transponder unit according to the first embodiment;

FIG. 3 is a diagram showing an example of compliant frequency stored in a compliant frequency storage section according to the first embodiment;

FIG. 4 is a diagram for describing an example of the information on frequency synchronization to be stored in the state storage section according to the first embodiment;

FIG. 6 is a block diagram showing a configuration of a transponder unit according to a second embodiment;

FIG. 10 is a diagram showing a program for the transponder unit according to the first embodiment.

DETAILED DESCRIPTION OF THE PREFERRED EMBODIMENTS

Figure 1:
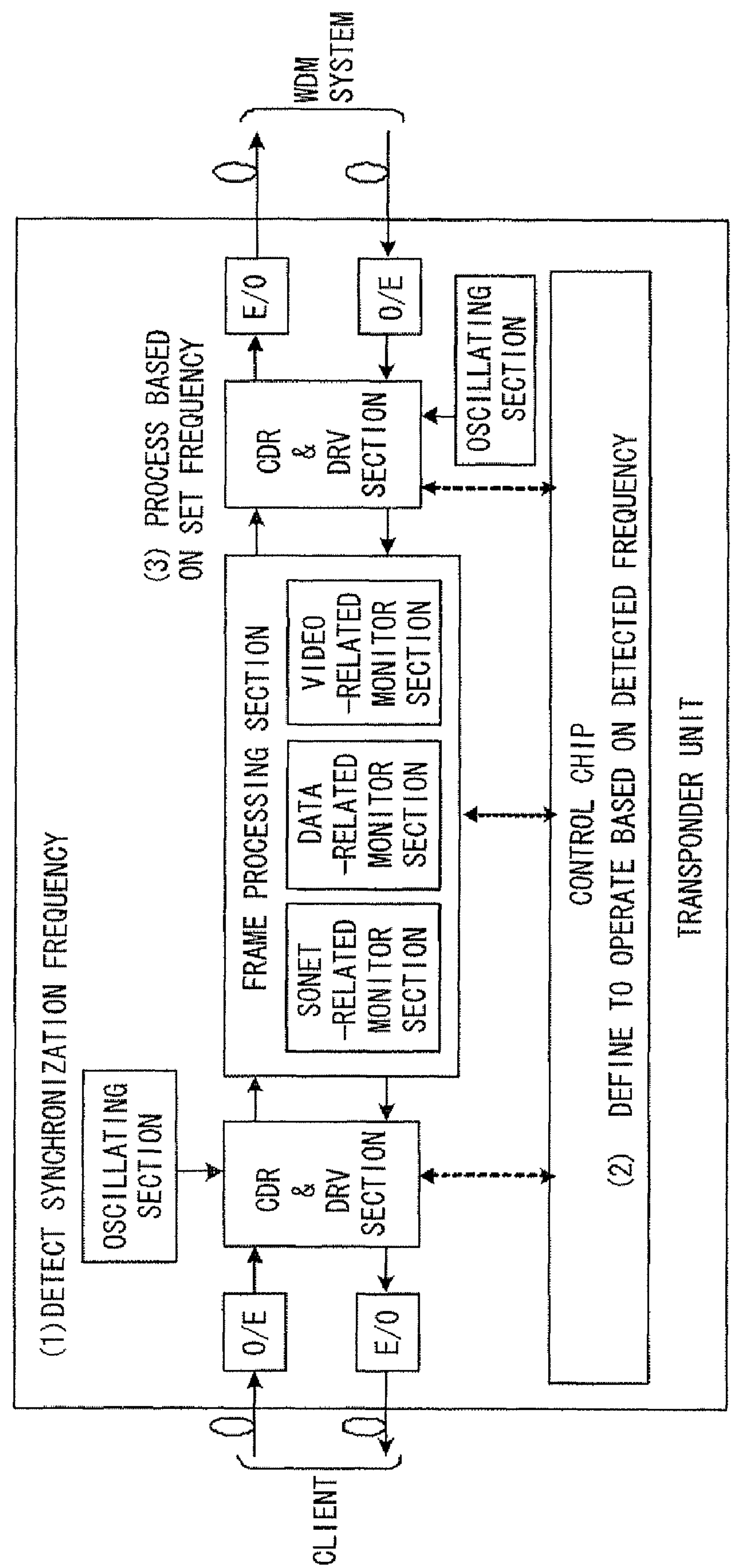
FIG. 1 is a diagram for explaining the outline and features of a transponder unit according to a first embodiment.

Reference may now be made in detail to embodiments of the present invention, examples of which are illustrated in the accompanying drawings, wherein like reference numerals refer to like elements throughout.

Embodiments of a transponder unit, a transponder unit control apparatus, a transponder unit control method and a transponder unit control program according to the invention will be described in detail below with reference to attached drawings. The outline and features of a transponder unit according to embodiments and configurations and processing flows of the transponder unit will be sequentially described below.

First Embodiment

Outline and Features of Transponder Unit

First of all, the outline and features of a transponder unit according to this embodiment will be described with reference to FIG. 1. FIG. 1 is a diagram showing the outline and features of a transponder unit according to this embodiment.

As shown in FIG. 1, a transponder unit according to a first embodiment includes an oscillating section that can output various frequencies (bit rates) to a CDR (Clock Data Recovery) section. The CDR section extracts clocks from an input signal and a frame processing section performs frame processing on the input signal. More specifically, the transponder unit includes an optical/electrical (O/E) converter that receives and electrically converts an optical signal from a client and an electrical/optical (E/O) converter that converts the electrically converted signal to an optical signal. The transponder unit also includes, a CDR & DRV section that extracts clocks from input data, and a frame processing section. An oscillating section that inputs a set frequency to the CDR & DRV section. Finally, a control chip controls functions of the transponder unit.

The frame processing section in the transponder unit according to the first embodiment has a processing section that is compliant with a data protocol. The frame processing section has, as shown in FIG. 1, a "SONET-related monitor section" that is a processing section compliant with a SONET-related data protocol, a "data-related monitor section" that is a processing section compliant with a data-related data protocol (such as a data protocol as in Gigabit Ethernet (registered trademark) and a "video-related monitor section" that is a processing section compliant with a video-related data protocol (such as a data protocol as in DV6000). These monitor sections operate based on the unique data protocols, and correspondence is established between each the data protocols and unique frequencies.

Then, a transponder unit as outlined above is mainly characterized in that the manual work for defining a data protocol to be used by a client can be reduced as described below.

That is, the transponder unit according to the first embodiment instructs the oscillating section to output an arbitrary frequency (bit rate) when a signal with unknown data protocol is input from a client. More specifically, the transponder unit instructs the oscillating section to sequentially output all frequencies (bit rates) that the oscillating section can output for the input signal.

Then, the transponder unit according to the first embodiment determines whether the frequencies output from the oscillating section in response to the instruction and the input signal synchronize in frequency or not and detects a synchronization frequency. The synchronization frequency is the frequency for the synchronization (refer to (1) in FIG. 1). In other words, the transponder unit determines whether all frequencies sequentially output from the oscillating section in response to the instruction and the input signal synchronize (LOCK) in frequency or not and detects the frequency band for the synchronization (LOCK). Then, the transponder unit detects the center frequency in the frequency band for the synchronization (LOCK) as the synchronization frequency.

Then, the transponder unit according to the first embodiment operates the frame processing section based on the detected synchronization frequency. For example, as described in (2) in FIG. 1, the transponder unit instructs the control chip to operate the frame processing section and the CDR & DRV section based on the detected frequency. As a result, the frame processing section and CDR & DRV section process an input signal based on the set frequency, as described in (3) in FIG. 1. In particular, the frame processing section has a processing section (monitor section) that operates based on a unique data protocol (for example, the monitor section may be the SONET-related monitor section, the data-related monitor section or the video-related monitor section). The frame processing section operates the processing section (monitor section) based on the data protocol corresponding to an instructed frequency to perform frame processing.

Thus, as described in the main characteristic, the transponder unit according to the first embodiment can reduce the manual work for defining a data protocol to be used by a client.

Configuration of Transponder Unit

Next, with reference to FIG. 2, a configuration of the transponder unit shown in FIG. 1 will be described. FIG. 2 is a block diagram showing a configuration of the transponder unit. As shown in FIG. 2, a transponder unit 1 includes a client side input/output section 10, a client side CDR & DRV section 20, a client side oscillating section 30, a frame processing section 40, a network side CDR & DRV section 50, a network side oscillating section 60, a network side input/output section 70 and a control section 100. Notably, the configuration of the transponder unit according to this embodiment will be described mainly on the points pertaining to this embodiment. The description on other configuration will be omitted or will be brief since it is the same as the one in a conventional transponder unit.

The client side input/output section 10 has a client side O/E section 11 that receives and electrically converts an optical signal from a client and a client side E/O section 12 that optically converts an electric signal and outputs the result to a client.

The client side CDR & DRV section 20 has a client side CDR (Clock Data Recovery) section 21 that extracts clocks from an input signal and a DRV (drive) section 22 that performs the inverse processing.

The client side oscillating section 30 is an oscillating section that outputs various frequencies to the client side CDR section 21. More specifically, the client side oscillating section 30 outputs the frequency instructed to a frequency setting section 102 by a frequency instructing section 108, which will be described later, to the client side CDR section 21.

The network side CDR & DRV section 50 has the same function as that of the client side CDR & DRV section 20. The network side oscillating section 60 has the same function as that of the client side oscillating section 30. The network side input/output section 70 has the same function as that of the client side input/output section 10.

The frame processing section 40 performs frame processing on an input signal. More specifically, the frame processing section 40 performs processing of adding control information, for example, to an input signal and constructing a frame structure (which will be called frame addition processing) under the control of the frame processing control section 110, which will be described later. Alternatively, the frame processing section 40 performs processing of removing a frame from an input signal (which will be called frame removal processing). In particular, the frame processing section 40 performs frame processing based on the settings in a speed & frequency setting data section 106, which will be described later, controlled by the frame processing control section 110 and a frame processing setting data section 107 (or by using a monitor section compliant with the data protocol corresponding to an instructed frequency, for example).

Then, as shown in FIG. 2, the frame processing section 40 has processing sections compliant with data protocols (such as a SONET-related monitor section 41, a data-related monitor section 42 and a video-related monitor section 43), an OTU-OH (Optical Channel Transport Unit_Over Head) adding section 44, an FEC (Forward Error Correction) adding section 45, an OTU-OH removing section 46, an FEC removing section 47, a speed converting section 48 and a speed converting section 49.

The OTU-OH adding section 44 adds an OTU-OH for performing frame addition processing. The FEC adding section 45 adds an error correction function (FEC) for performing frame addition processing. The OTU-OH removing section 46 removes an OTU-OH for performing frame removal processing. The FEC removing section 47 removes an error correction function (FEC) for performing frame removal processing. The speed converting section 48 and the speed converting section 49 perform speed conversion on a signal input to the frame processing section 40. For example, the speed converting section 48 and the speed converting section 49 has a voltage controlled crystal oscillator (VCXO).

The control section 100 has an internal memory for storing a control program, a program defining a routine, for example, and necessary data. The control section 100 is a processing section that performs various routines by the programs. According to this embodiment, the control section 100 mainly includes a CPU section 101, a frequency setting section 102, a state monitoring section 103, a state storage section 104, a supported frequency storage section 105, a speed & frequency setting data section 106, and a frame processing setting data section 107.

The supported frequency storage section 105 stores the frequency supported by the oscillating section. More specifically, the supported frequency storage section 105 stores all frequencies that the client side oscillating section 30 and/or the network side oscillating section 60 can output. Describing in particular, as shown in FIG. 3, the supported frequency storage section 105 stores on a "OSCILLATOR SUPPORTING FREQUENCY TABLE" the "HIGHEST FREQUENCY (MHz)" describing the highest frequency that the client side oscillating section 30 and/or the network side oscillating section 60 can output and the "LOWEST FREQUENCY (MHz)" describing the lowest frequency that the client side oscillating section 30 and/or the network side oscillating section 60 can output.

In the example shown in FIG. 3, the supported frequency storage section 105 stores "2666.325" as the "HIGHEST FREQUENCY (MHz)" and "621.9866" as the "LOWEST FREQUENCY (MHz)" on the "OSCILLATOR SUPPORTING FREQUENCY TABLE". Notably, FIG. 3 shows an example of the supported frequencies to be stored in the supported frequency storage section according to the first embodiment.

The state storage section 104 stores a result of the monitoring by the state monitoring section 103, which will be described later. More specifically, as shown in FIG. 4, the state storage section 104 stores a "REFERENCE FREQUENCY (MHz) IN OSCILLATING SECTION" describing the frequency output from the client side oscillating section 30 to the client side CDR section 21 and a "CDR STATE" describing a result of the monitoring by the state monitoring section 103, which will be described later, in connection with each other. The state storage section 104 further stores a "CENTER FREQUENCY" describing the center frequency in a frequency band calculated by the detecting section 109, which will be described later, a "DEVIATION (ppm) FROM CENTER FREQUENCY" describing the deviation (ppm) from the center frequency calculated by the detecting section 109, which will be described later, and a "WIDTH OF FREQUENCY BAND" describing the width of the frequency band calculated by the detecting section 109, which will be described later, in connection with each other.

In the example shown in FIG. 4, the state storage section 104 stores "2666.325" and "Un-LOCK" as the "REFERENCE FREQUENCY (MHz) IN OSCILLATING SECTION" and the "CDR STATE", respectively, in connection with each other. The state storage section 104 stores "2666.058", "1100.3729 and −100.035" and "±100 ppm" as the "CENTER FREQUENCY", the "DEVIATION (ppm) FROM CENTER FREQUENCY" and the "WIDTH OF FREQUENCY BAND", respectively, in connection with each other. Notably, FIG. 4 shows an example of the information on frequency synchronization stored in the state storage section according to the first embodiment.

The speed & frequency setting data section 106 defines the setting controlled by the frame processing control section 110, which will be described later, to the speed converting section 48, speed converting section 49 and network side oscillating section 60. More specifically, information on the frequency to be set is input from the frame processing control section 110 to the speed & frequency setting data section 106, which then defines the setting corresponding to the input frequency to the speed converting section 48, speed converting section 49 and network side oscillating section 60.

The frame processing setting data section 107 defines the setting controlled by the frame processing control section 110, which will be described later, to the frame processing section 40. More specifically, information on the frequency to be set is input from the frame processing control section 110 to the frame processing setting data section 107, which then defines the setting corresponding to the input frequency to the frame processing section 40. For example, the frame processing setting data section 107 defines the data protocol corresponding to the input frequency and defines the monitor section (such as the SONET-related monitor section) to be used in the frame processing section 40.

The frequency setting section 102 defines an arbitrary frequency instructed by the frequency instructing section 108, which will be described later, to the client side oscillating section 30.

The state monitoring section 103 monitors whether the frequency output from the client side oscillating section 30 and an input signal synchronize in frequency or not in response to an instruction by the detecting section 109, which will be described later. More specifically, in response to an instruction by the detecting section 109, the state monitoring section 103 determines whether all of the frequencies sequentially output from the oscillating section in response to the instruction and an input signal synchronize in frequency or not and detects the frequency band for the synchronization. In particular, the state monitoring section 103 monitors whether the frequency output from the client side oscillating section 30 and an input signal synchronize in frequency (LOCK) or not and stores the "REFERENCE FREQUENCY IN OSCILLATING SECTION" and the "CDR STATE" in the state storage section 104 in connection with each other.

For example, the state monitoring section 103 outputs a frequency (such as "2666.325") from the client side oscillating section 30 in response to an instruction by the detecting section 109, which will be described later. After that, if the frequency and the input signal do not synchronize in frequency (LOCK), the output frequency (such as "2666.325") and "Un-LOCK" in connection are stored in the state storage section 104. In a case where a frequency (such as "2666.057") is output from the client side oscillating section 30 and then synchronizes with an input signal in frequency (LOCK), the output frequency (such as "2666.057") and "LOCK" in connection are stored in the state storage section 104.

The CPU 101 is a control section that controls the transponder. The CPU section 101 has the frequency instructing section 108, the detecting section 109, the frame processing control section 110 and a frame processing monitoring section 111. The frequency instructing section 108 and the frequency setting section 102 correspond to the claimed "frequency instruction processing section". The detecting section 109 and the state monitoring section 103 correspond to the claimed "detection processing section". The frame processing control section 110, the speed & frequency setting data section 106 and the frame processing setting data section 107 correspond to the claimed "frame processing section control section". The frame processing monitoring section 111 corresponds to the claimed "monitoring section".

The frequency instructing section 108 instructs an oscillating section to output an arbitrary frequency. More specifically, the frequency instructing section 108 instructs the client side oscillating section 30 to sequentially output all frequencies that the client side oscillating section 30 can output. In particular, the frequency instructing section 108 instructs the client side oscillating section 30 to sequentially output the "HIGHEST FREQUENCY" (or the "LOWEST FREQUENCY") through the "LOWEST FREQUENCY" (or the "HIGHEST FREQUENCY") stored in the supported frequency storage section 105.

For example, when a signal is input to the client side O/E section 11, the frequency instructing section 108 loads the "HIGHEST FREQUENCY 2666.325" (or "LOWEST FREQUENCY 621.9866") stored in the supported frequency storage section 105 (refer to FIG. 3). The frequency instructing section 108 instructs the frequency setting section 102 to sequentially output from the "HIGHEST FREQUENCY" (or the "LOWEST FREQUENCY") loaded by the client side oscillating section 30. As a result, the frequency setting section 102 sets a frequency to the client side oscillating section 30. Then, the frequency instructing section 108 instructs the frequency setting section 102 to slightly decrease (or increase) the frequency set to the client side oscillating section 30 if all frequencies that the client side oscillating section 30 can output are not output. As a result, the frequency setting section 102 sets the frequency to the client side oscillating section 30 according to the instruction by the frequency instructing section 108.

In particular, the frequency instructing section 108 instructs the frequency setting section 102 to slightly decrease (or increase) the frequency set to the client side oscillating section 30 if the frequency synchronization (LOCK) is detected by the detecting section 109, which will be described later. On the other hand, if the frequency synchronization (LOCK) is not detected, the frequency instructing section 108 instructs the frequency setting section 102 to largely decrease (or increase) by the amount more than the amount of decrease when the frequency synchronization (LOCK) with the frequency set to the client side oscillating section 30 is detected. As a result, the frequency setting section 102 sets the frequency to the client side oscillating section 30 according to the instruction by the frequency instructing section 108.

The detecting section 109 detects the synchronization frequency, which is a frequency synchronizing between the frequency output from an oscillating section in response to the instruction and an input signal. More specifically, the detecting section 109 detects the center frequency in the synchronizing frequency band as the synchronization frequency. If multiple synchronizing frequency bands are detected, the center frequency of the widest one of the detected multiple frequency bands is detected as the synchronization frequency.

In particular, the detecting section 109 detects the synchronizing frequency band based on the "REFERENCE FREQUENCY IN OSCILLATING SECTION" and "CDR STATE" stored in the state storage section 104 by the state monitoring section 103. If one synchronizing frequency band is detected, the detecting section 109 detects the "CENTER FREQUENCY" in the frequency band as the synchronization frequency. If multiple synchronizing frequency bands are detected, the detecting section 109 calculates the "DEVIATION (ppm) FROM CENTER FREQUENCY" of the synchronization frequencies. Then, the "WIDTH OF FREQUENCY BAND (LOCK WIDTH)" is calculated, and the "CENTER FREQUENCY" describing the highest value in the calculated "FREQUENCY BAND (LOCK WIDTH)" as the synchronization frequency. In other words, the synchronization frequency is detected from the widest frequency band.

For example, describing with reference to the example shown in FIG. 4, the detecting section 109 detects the synchronizing frequency band (such as the frequency band at "2666.325" through "2665.79") from the "REFERENCE FREQUENCY IN OSCILLATING SECTION" and the "CDR STATE" stored in the state storage section 104 by the state monitoring section 103. Then, if one synchronizing frequency band is detected, the detecting section 109 detects the "CENTER FREQUENCY" (such as "2666.058") as the synchronization frequency in the synchronizing frequency band (such as the frequency band at "2666.325" through "2665.79"). On the other hand, if multiple synchronizing frequency bands are detected (such as the frequency band at "2666.325" through "2665.79" and the frequency band at "622.1733 through "621.9867"), the detecting section 109 calculates the "CENTER FREQUENCIES" (such as "2666.058" and "622.08") of the frequency bands. Then, the "DEVIATION (ppm) FROM CENTER FREQUENCY" of each of them is calculated, and the "WIDTH (LOCK WIDTH) OF FREQUENCY BAND" is calculated. For example, with reference to the "CENTER FREQUENCY: 2666.058", the "DEVIATION (ppm) FROM CENTER FREQUENCY: 100.3729 through −100.035" is calculated, and the "WIDTH OF FREQUENCY BAND (LOCK WIDTH): ±100 ppm" is calculated. For example, with reference to the "CENTER FREQUENCY: 622.08", the "DEVIATION (ppm) FROM CENTER FREQUENCY: 149.9807 through −149.981" is calculated, and the "WIDTH OF FREQUENCY BAND (LOCK WIDTH): ±150 ppm" is calculated. After that, the "WIDTHS OF FREQUENCY BAND (LOCK WIDTHS)" (such as "±100 ppm" and "±150 ppm" are compared, and the "CENTER FREQUENCY" (such as the "CENTER FREQUENCY: 622.08") indicating the highest value (such as "±150 ppm") in the calculated "WIDTH OF FREQUENCY BAND (LOCK WIDTH)" is detected as the synchronization frequency.

The detecting section 109 assumes the case where it is determined that the frame processing section 40 has an error in the processing based on the data protocol set by the frame processing control section 110, which will be described later, and detects multiple synchronization frequencies. More specifically, in the processing of detecting synchronization frequencies, synchronization frequency candidates are also detected, which have higher possibilities of being the synchronization frequency. Then, if it is determined that the frame processing section 40 has an error, the detecting section 109 detects the synchronization frequency candidates as the multiple detected synchronization frequencies.

For example, describing with reference to the example shown in FIG. 4, the detecting section 109 loads and compares the "WIDTHS OF FREQUENCY BAND (LOCK WIDTHS)", "±100 ppm" and "±150 ppm", which are stored in connection with the "CENTER FREQUENCY" when the detecting section 109 detects the "CENTER FREQUENCIES" "2666.058" and "622.08". Then, the detecting section 109 detects the "622.08" as the synchronization frequency and also detects "2666.058" as the synchronization frequency candidate. Then, the frame processing control section 110, which will be described later, operates the frame processing section 40 based on the detected synchronization frequency "622.08". After that, in a case where the frame processing monitoring section 111 monitors that the processing in the frame processing section 40 has an error, the detecting section 109 immediately detects the synchronization frequency candidate (such as "2666.058") as the synchronization frequency.

The frame processing control section 110 operates the frame processing section based on the detected synchronization frequency. More specifically, the frame processing control section 110 operates the frame processing section 40 based on the synchronization frequency detected by the detecting section 109. For example, when the detecting section 109 detects a synchronization frequency (such as "622.08"), the frame processing control section 110 controls the settings in the speed & frequency setting data section 106 and the frame processing setting data section 107 so as to perform frame processing based on the detected synchronization frequency. As a result, the speed & frequency setting data section 106 defines the speed converting section 48, speed converting section 49 and network side oscillating section 60 (that is, sets the frequency to be output from the network side oscillating section 60) under the control of the frame processing control section 110. The frame processing setting data section 107 defines the frame processing section 40 under the control of the frame processing control section 110. For example, the frame processing setting data section 107 defines the data protocol corresponding to the input frequency. The frame processing setting data section 107 defines the monitor section (such as the SONET-related monitor section) to be used in the frame processing section 40.

The frame processing control section 110 operates the frame processing section based on the next synchronization frequency candidate (such as "2666.058") in a case where the frame processing monitoring section 111, which will be described later, monitors an error. On the other hand, if no subsequent synchronization frequency candidates exist, the processing ends.

The frame processing monitoring section 111 monitors whether the processing by the frame processing section has an error or not after the frame processing section starts operating. More specifically, after the frame processing section 40 starts operating under the control of the frame processing control section 110, the frame processing monitoring section 111 monitors whether the processing by the frame processing section has an error or not. For example, the synchronization frequency "622.08" is input from the frame processing control section 110 to the speed & frequency setting data section 106 and the frame processing setting data section 107. Then, the frame processing monitoring section 111 monitors whether the processing in the frame processing section 40 has an error or not after the frame processing based on the setting corresponding to the synchronization frequency "622.08" is started in the frame processing section 40.

Processing by Transponder Unit

Figure 5:
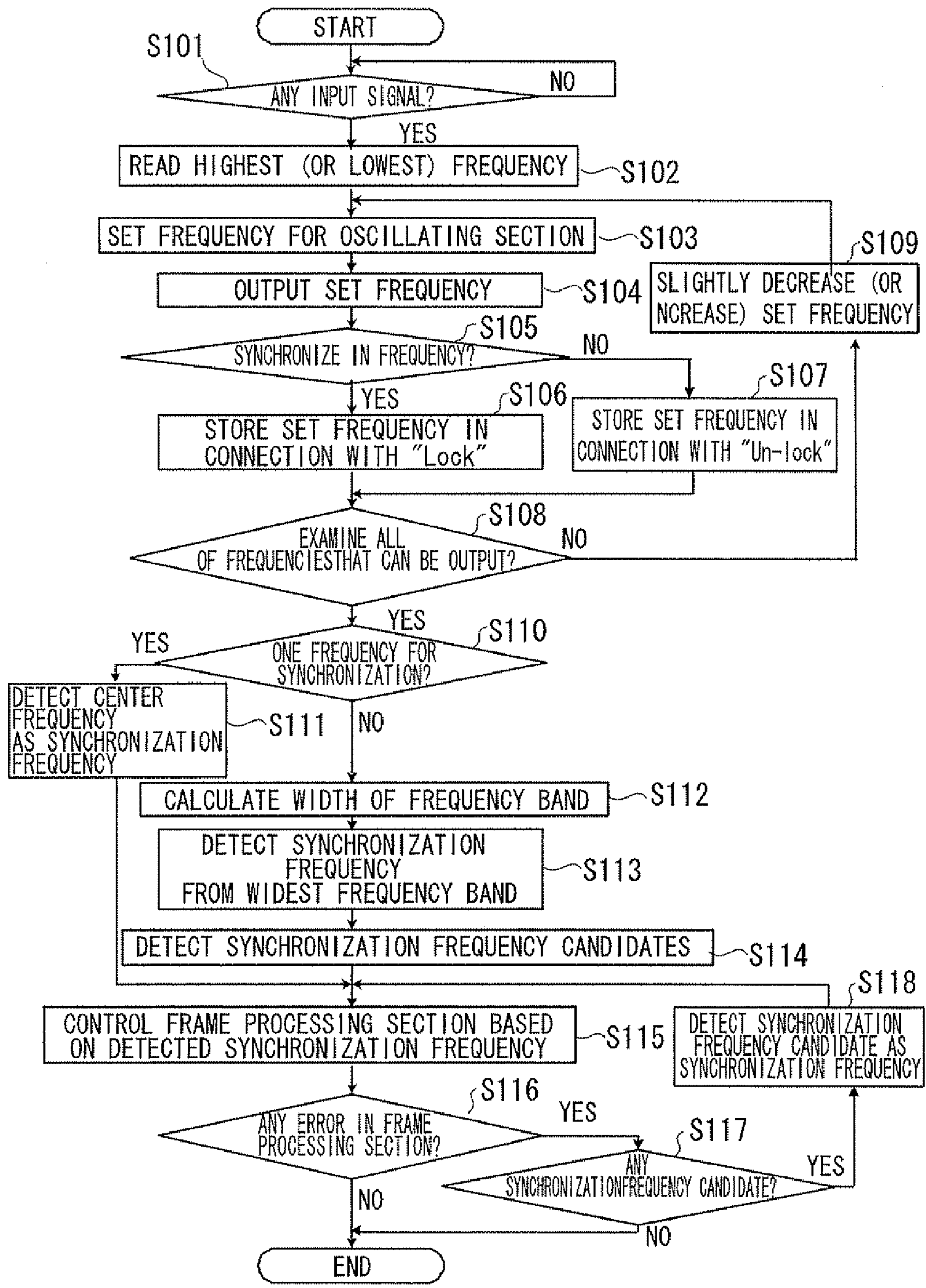
FIG. 5 is a flowchart showing processing by a scan method according to the first embodiment.

Next, with reference to FIG. 5, processing by the transponder unit will be described. FIG. 5 is a flowchart showing processing by a scan method according to the first embodiment.

As shown in FIG. 5, if a signal is input to the client side O/E section (Yes in operation S101), the frequency instructing section 108 loads the "HIGHEST FREQUENCY" (or "LOWEST FREQUENCY") stored in the supported frequency storage section 105 (operation S102). Then, the frequency is set to the oscillating section (operation S103). In other words, the frequency instructing section 108 instructs the frequency setting section 102 such that the frequency setting section 102 can define the client side oscillating section 30 to sequentially output from the "HIGHEST FREQUENCY" (or "LOWEST FREQUENCY") loaded from the supported frequency storage section 105. Then, the client side oscillating section 30 outputs the set frequency (operation S104).

Then, the state monitoring section 103 determines whether the input signal synchronizes with the frequency or not (operation S105). Here, if the input signal synchronizes with the frequency (LOCK) (Yes in operation S105), the state monitoring section 103 stores the output frequency (such as "2666.057") in connection with "LOCK" in the state storage section 104 (operation S106). On the other hand, if the input signal does not synchronize with the frequency (Un-LOCK) (No in operation S105), the state monitoring section 103 stores the output frequency (such as "2666.325") in connection with "Un-Lock" in the state storage section 104 (operation S107).

Then, the frequency instructing section 108 determines whether all of the frequencies that the client side oscillating section 30 can output have been examined or not (operation S108). Here, if all of the frequencies have not been examined (No in operation S108), that is, all of the frequencies have not been output from the client side oscillating section 30 in response to the instruction by the frequency instructing section 108, the frequency instructing section 108 instructs the frequency setting section 102 to slightly decrease (or increase) the frequency set to the client side oscillating section 30 (operation S109). Then, the detecting section 109 examines the reset frequencies (operations S103 to S107).

Then, if all of the frequencies that the client side oscillating section 30 can output have been output in response to the instruction by the frequency instructing section 108, and one synchronizing frequency band is detected (Yes in operation S108 and Yes in operation S110), the detecting section 109 detects the "CENTER FREQUENCY" in the frequency band as the synchronization frequency (operation S111).

On the other hand, if all of the frequencies that the client side oscillating section 30 can output have been output in response to the instruction by the frequency instructing section 108 and multiple synchronizing frequency bands are detected (Yes in operation S108 and No in operation S110), the detecting section 109 calculates the widths of the frequency bands (operation S112). That is, the "DEVIATION (ppm) FROM CENTER FREQUENCY" of each of the synchronizing frequencies is calculated, and the "WIDTH OF FREQUENCY BAND (LOCK WIDTH)" is calculated. Then, the detecting section 109 detects the synchronization frequency from the widest frequency band (operation S113). That is, the "CENTER FREQUENCY" indicating the highest value among the calculated "WIDTHS OF FREQUENCY BANDS (LOCK WIDTHS)" is detected as the synchronization frequency. Then, the detecting section 109 detects the synchronization frequency and detects a synchronization frequency candidate (operation S114).

Then, the frame processing control section 110 operates the frame processing section based on the detected synchronization frequency (operation S115). Then, the frame processing monitoring section 111 monitors whether the frame processing section 40 has an error or not (operation S116). Here, if an error in the frame processing section is monitored and there is a synchronization frequency candidate (Yes in operation S116 and Yes in operation S117), that is, if the frame processing monitoring section 111, which will be described later, monitors that the processing in the frame processing section 40 has an error and the detecting section 109 has detected a synchronization frequency candidate, the detecting section 109 detects the synchronization frequency candidate (such as "2666.058") as the synchronization frequency (operation S118).

Then, if the frame processing section does not have an error (No in operation S116) or if the frame processing section has an error but no synchronization frequency candidate exists (Yes in operation S116 but No in operation S117), the processing ends.

Effects of First Embodiment

As described above, according to the first embodiment, the transponder unit instructs an oscillating section to output an arbitrary frequency. Then, whether the frequency output from the oscillating section in response to the instruction and an input signal synchronize in frequency or not is determined, and the synchronization frequency is detected. Then, the frame processing section is operated based on the detected synchronization frequency. Thus, the transponder unit can detect the synchronizing frequency from an input signal and control the operation by the frame processing section. Therefore, the manual work for defining a data protocol to be used in the client can be reduced.

Further, according to the first embodiment, the transponder unit instructs an oscillating section to sequentially output all frequencies that the oscillating section can output. Then, whether each of all of the frequencies sequentially output from the oscillating section in response to the instruction synchronizes with an input signal or not is determined, and the synchronizing frequency band is detected. Since the transponder unit detects the center frequency in the synchronizing frequency band as the synchronization frequency, the synchronizing frequency can be detected by examining all of the supported frequencies, and the operation by the frame processing section can be controlled. Then, the manual work for defining a data protocol to be used in the client can be reduced.

According to the first embodiment, the transponder unit detects the center frequency in the widest frequency band among multiple detected frequency bands as the synchronization frequency if multiple synchronizing frequency bands are detected. Therefore, the frequency with the highest possibility of synchronizing most accurately among them can be detected even if multiple frequencies which synchronize with an input signal are detected.

According to the first embodiment, the transponder unit monitors whether the processing by the frame processing section has an error or not after the frame processing section starts operating and detects the synchronization frequency again if the occurrence of an error is determined. Then, the frame processing section is operated based on the synchronization frequency detected again. Therefore, an accurate synchronization frequency can be detected again even if an improper synchronization frequency is detected, and the operation can be controlled securely based on an input signal.

According to the first embodiment, the transponder unit also detects a synchronization frequency candidate, which is a frequency with a higher possibility of being a synchronization frequency, in detecting the synchronization frequency. Then, if the occurrence of an error is determined, the synchronization frequency candidate is detected as the synchronization frequency detected again. Therefore, quick processing can be implemented by defining other synchronization frequency candidate and controlling the operation even if an improper synchronization frequency is detected.

Second Embodiment

Having described the first embodiment where a synchronization frequency is detected by examining the synchronization with all of supported frequencies, embodiments are not limited thereto. A synchronization frequency may be detected by sampling an input signal. A case where a synchronization frequency is detected by sampling an input signal will be described as a second embodiment. The identical points to those of the transponder unit according to the first embodiment will be described briefly.

Configuration of Transponder Unit According to Second Embodiment

First of all, with reference to FIG. 6, a configuration of a transponder unit according to a second embodiment will be described. FIG. 6 is a block diagram showing a configuration of the transponder unit according to the second embodiment. As shown in FIG. 6, a transponder unit 1 includes a client side input/output section 10, a client side CDR & DRV section 20, a client side oscillating section 30, a frame processing section 40, a network side CDR & DRV section 50, a network side oscillating section 60, a network side input/output section 70, a sampling oscillating section 80 that outputs a sampling frequency to be used for sampling by a detecting section 109*b*, which will be described later, and a control section 100.

The same reference numerals are given to the same operations as those of the first embodiment, the description of which will be omitted herein. The sampling oscillating section 80, a frequency instructing section 108*b*, a detecting section 109*b*, a sampling section 112 and a frequency calculating section 113 will be only described.

The sampling oscillating section 80 outputs a sampling frequency, which is a frequency set for sampling, to the sampling section 112 in response to the instruction by the frequency instructing section 108*b*, which will be described later.

This embodiment describes a case where the sampling oscillating section 80 is provided separately from the client side oscillating section 30 and/or the network side oscillating section 60. However, this embodiment is not limited to the case, in the alternative, the sampling oscillating section 80 may be provided unitedly with the client side oscillating section 30 and/or the network side oscillating section 60 and may output a sampling frequency to the sampling section 112.

Figure 7A:
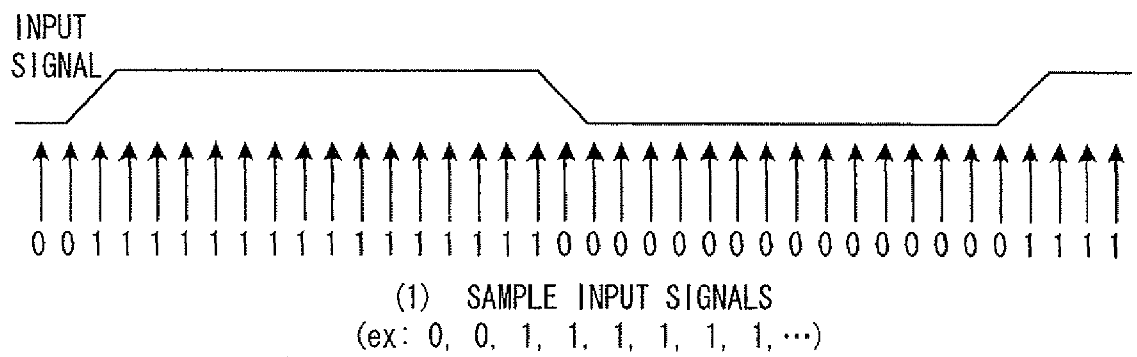
FIGS. 7A to 7C are diagrams for explaining an example of the processing for detecting a synchronization frequency by the sampling method according to the second embodiment.

The sampling section 112 samples an input signal by using the sampling frequency in response to the instruction by the frequency instructing section 108*b*, which will be described later. For example, as described in FIG. 7A, the sampling frequency is used to obtain the sampling result including "0" and "1" (such as "0, 0, 1, 1, 1, 1, 1, 1 . . . in FIG. 7A) from the signal electrically converted by the client side O/E section 11 in response to the instruction by the frequency instructing section 108*b*, which will be described later.

The frequency calculating section 113 identifies points of change from the sampling result in response to the instruction by the frequency instructing section 108*b*, which will be described later. After that, the frequency calculating section 113 calculates the point-of-change cycle frequency, which is a point-of-change cycle, from the value of the sampling frequency and the points of change.

Figure 7B:
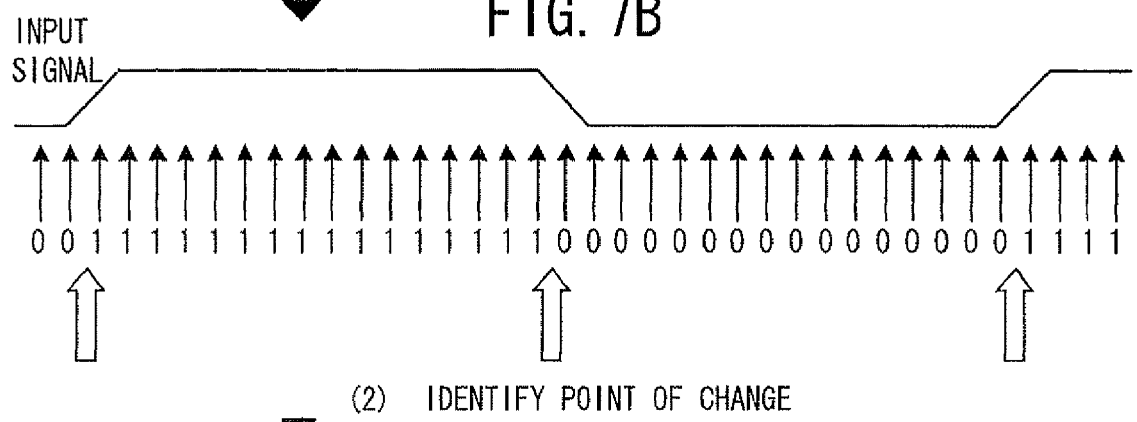
Figure 7C:
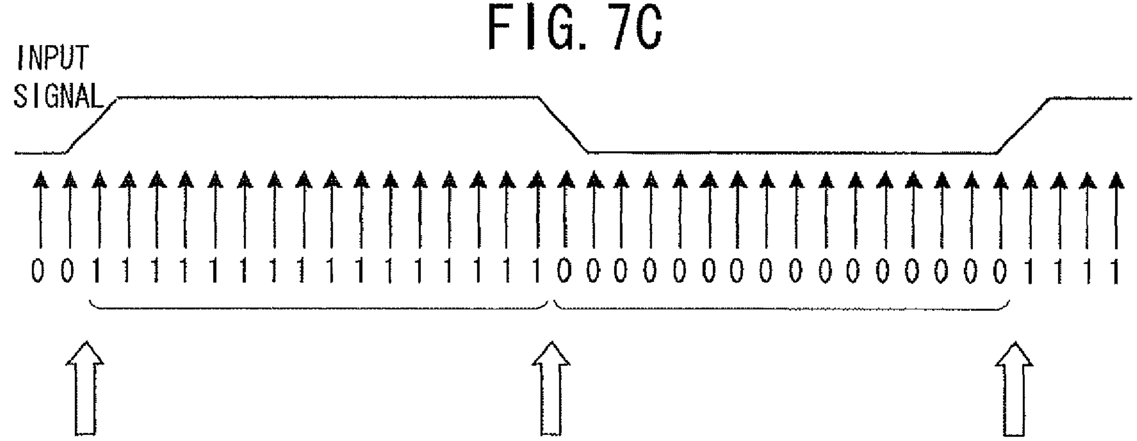

For example, as described in FIG. 7B the frequency calculating section 113 identifies the points of change where "0" is changed to "1" (or "1" to "0") based on the sampling result (such as "0, 0, 1, 1, 1, 1, 1, 1 . . . " in FIG. 7A) including "0" and "1" in response to the instruction by the frequency instructing section 108*b*, which will be described later. The sampling result is detected in the sampling section 112 (refer to the arrow in FIG. 7B). After that, as described in FIG. 7C, the point-of-change cycle frequency is calculated (such as 2 GHz/16=0.125 GHz=125 MHz) from the sampling result (such as "0, 0, 1, 1, 1, 1, 1, 1 . . . "), the sampling frequency (such as 2 GHz) and the points of change (such as a cycle of 16).

The frequency instructing section 108*b* samples an input signal by using the sampling frequency, identifies the points of change from the sampling result, and calculates the point-of-change cycle frequency, which is a cycle of points of change, from the value of the sampling frequency and the points of change. Then, the frequency instructing section 108*b* further instructs the oscillating section to output the calculated point-of-change cycle frequency.

For example, when a signal is input to the client side O/E section, the frequency instructing section 108*b* inputs the input signal to the sampling section 112. Then, the sampling oscillating section 80 instructs the sampling section 112 to output a sampling frequency. As a result, the sampling oscillating section 80 outputs the sampling frequency to the sampling section 112.

Then, the frequency instructing section 108*b* instructs the sampling section 112 to sample the input signal. As a result, the sampling section 112 samples the input signal (refer to FIG. 7A). Then, the frequency instructing section 108*b* instructs the frequency calculating section 113 to identify points of change from the obtained sampling result and calculate the point-of-change cycle frequency. As a result, the frequency calculating section 113 identifies the points of change from the obtained sampling result.

Then, the frequency calculating section 113 calculates the point-of-change cycle frequency from the obtained sampling result, the sampling frequency (such as 2 GHz) and points of change (such as a cycle of 16). In other words, the frequency calculating section 113 calculates a frequency with a higher possibility of being a point-of-change cycle frequency from the sampling result, the sampling frequency and the points of change. The frequency calculating section 113 further calculates, as the point-of-change cycle frequency the frequency closest to the frequency information stored in the supported frequency storage section 105.

Then, the frequency instructing section 108*b* instructs the frequency setting section 102 to output the calculated point-of-change cycle frequency from the client side oscillating section 30. The frequency instructing section 108*b* assumes a case where outputting a harmonic of the point-of-change cycle frequency calculated by the detecting section 109*b*, which will be described later, from the client side oscillating section 30 is instructed and calculates the harmonic as a synchronization frequency candidate from the calculated point-of-change cycle frequency.

Figure 8A:
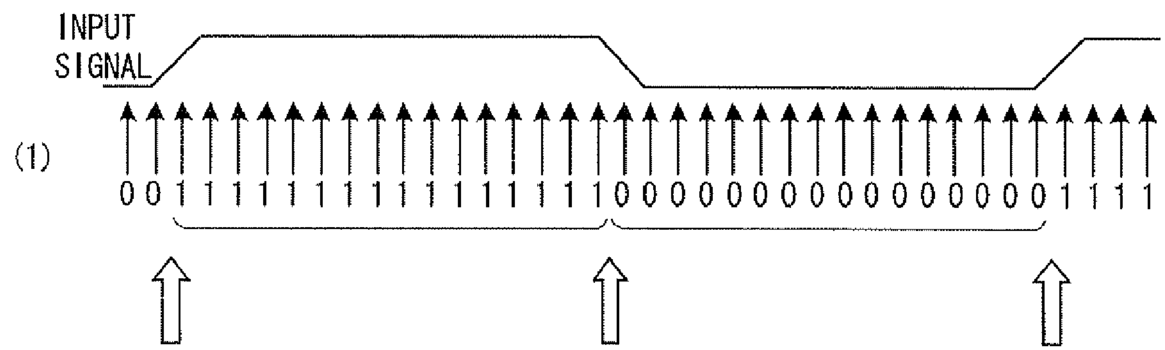
FIGS. 8A to 8D are diagrams for explaining an example of the processing for detecting a synchronization frequency by a sampling method according to the second embodiment.
Figure 8B:
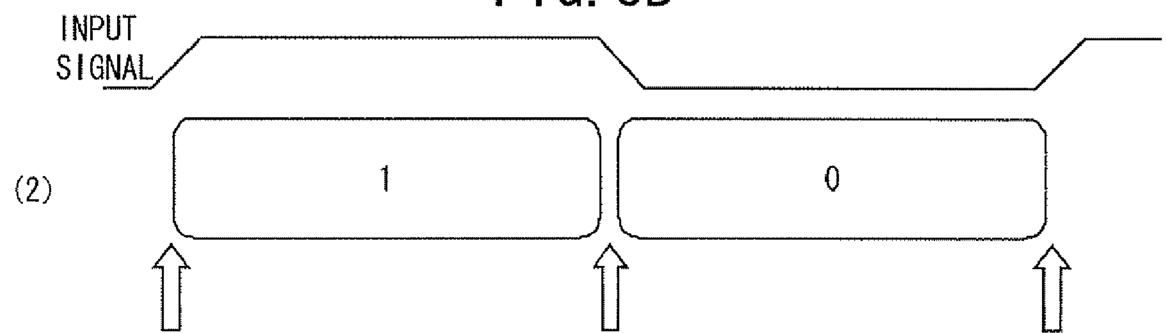

With reference to FIGS. 8A to 8D, for example, the calculation of a harmonic by the frequency instructing section 108*b* will be described. The frequency instructing section 108*b* is instructed to calculate a harmonic by the detecting section 109*b*, which will be described later. The frequency instructing section 108*b*, as shown in FIG. 8A, determines that the point of change cycle frequency (such as 125 MHz) calculated from the sampling result (such as "0, 0, 1, 1, 1, 1, 1, 1 . . . "), the sampling frequency (such as 2 GHz) and the points of change (such as a cycle of 16) is a bit rate of a low frequency. In other words, as shown in FIGS. 8A to 8D, the frequency instructing section 108*b* determines that it is not the cycle of an input signal (which is a cycle that "1" and "0" change alternately).

Figure 8C:
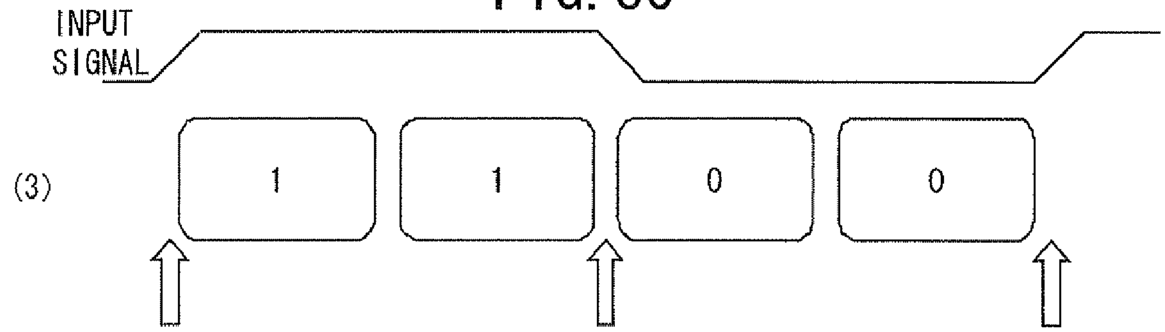
Figure 8D:
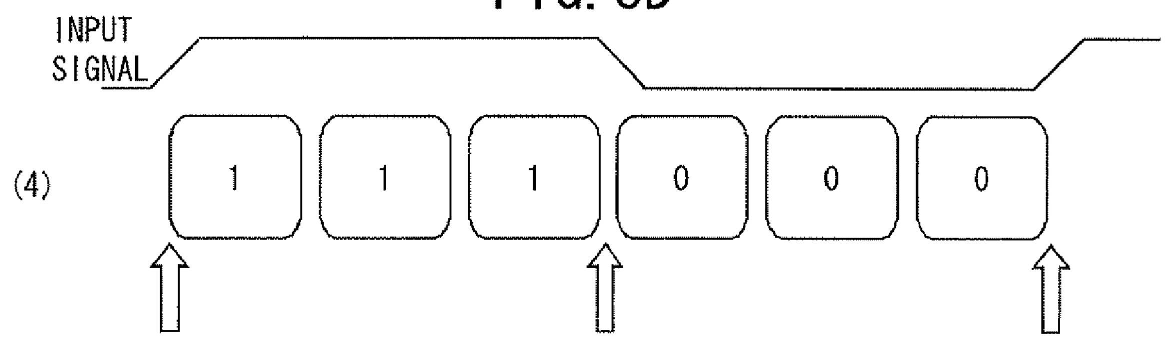

As a result, as shown in FIGS. 8C and 8D, the frequency instructing section 108*b* determines that the calculated point-of-change cycle frequency is a frequency exhibiting the cycle of a series of multiple "1" or "0" and calculates a harmonic as a synchronization frequency candidate. In other words, in the example shown in FIG. 8C, for example, the frequency instructing section 108*b* determines the frequency having a series of two "1" and two "0" and calculates 250 MHz, which is twice as high as 125 MHz. In the example shown in FIG. 8D, the frequency instructing section 108*b* determines the frequency having a series of three "1" and "0" and calculates 375 MHz, which is triple as high as 125 MHz.

The frequency instructing section 108*b* instructs the frequency setting section 102 to output the calculated harmonic from the client side oscillating section 30 in response to the instruction to output the harmonic of the point-of-change cycle frequency calculated by the detecting section 109, which will be described later, from the client side oscillating section 30.

The detecting section 109*b* determines whether the point-of-change cycle frequency output from the oscillating section in response to the instruction and an input signal synchronize in frequency or not. If so as a result of the determination, the point-of-change cycle frequency is detected as the synchronization frequency. If not, on the other hand, the detecting section 109*b* causes the frequency instructing section 108*b* to set the harmonic of the point-of-change cycle frequency to the oscillating section and determines whether the harmonic and an input signal synchronize in frequency or not again.

More specifically, the detecting section 109*b* determines whether the point-of-change cycle frequency (such as 125 MHz) output by the client side oscillating section 30 and an input signal synchronize in frequency or not. Then, if so, the detecting section 109*b* detects the point-of-change cycle frequency (such as 125 MHz) as the synchronization frequency. If not, on the other hand, the detecting section 109*b* causes the frequency instructing section 108*b* to calculate a harmonic of the point-of-change cycle frequency (such as 250 MHz), causes the client side oscillating section 30 to output the harmonic and performs the determination again.

Processing By Sampling Method According To Second Embodiment

Figure 9:
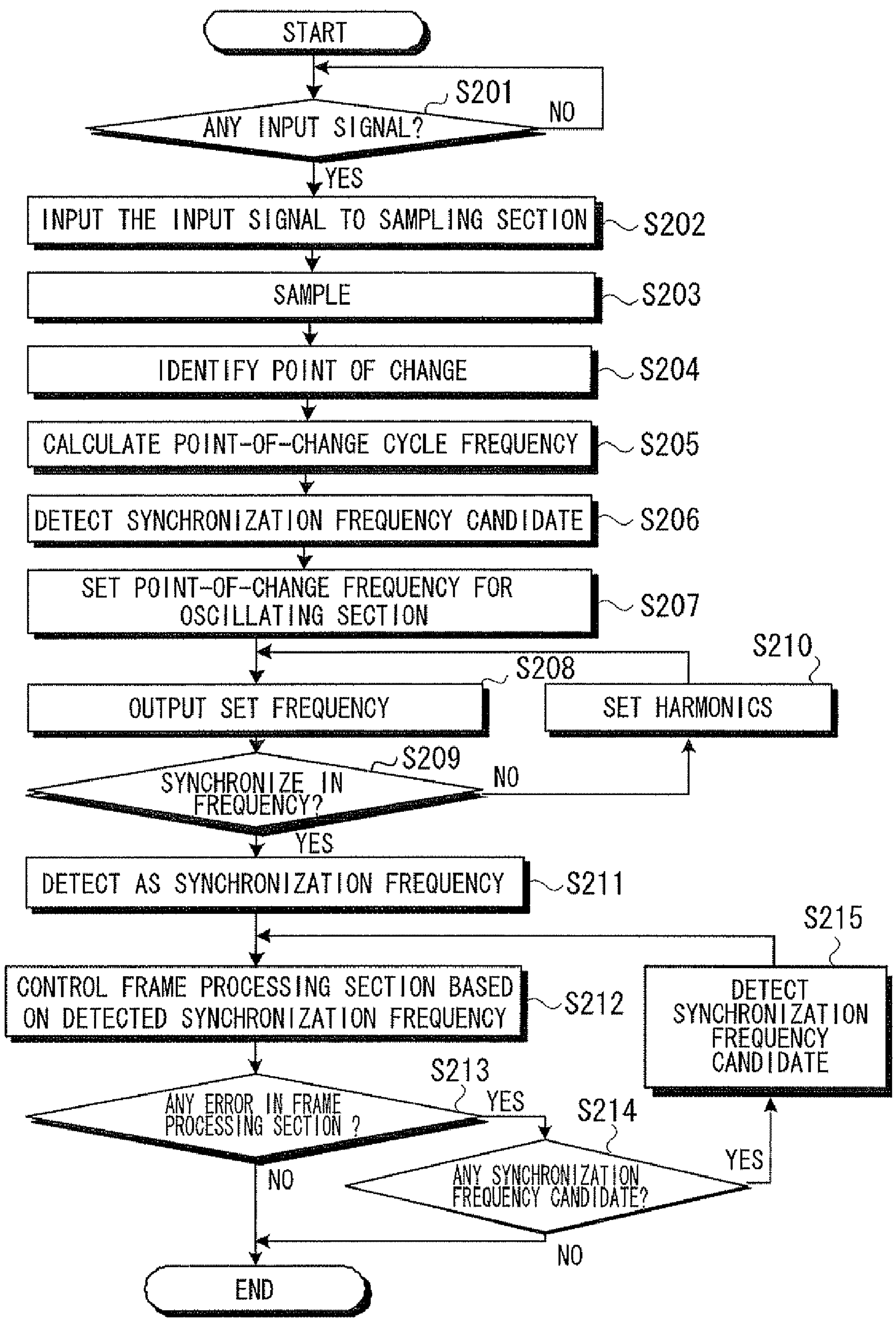
FIG. 9 is a flowchart showing processing by the sampling method according to the second embodiment.
Figure 11:
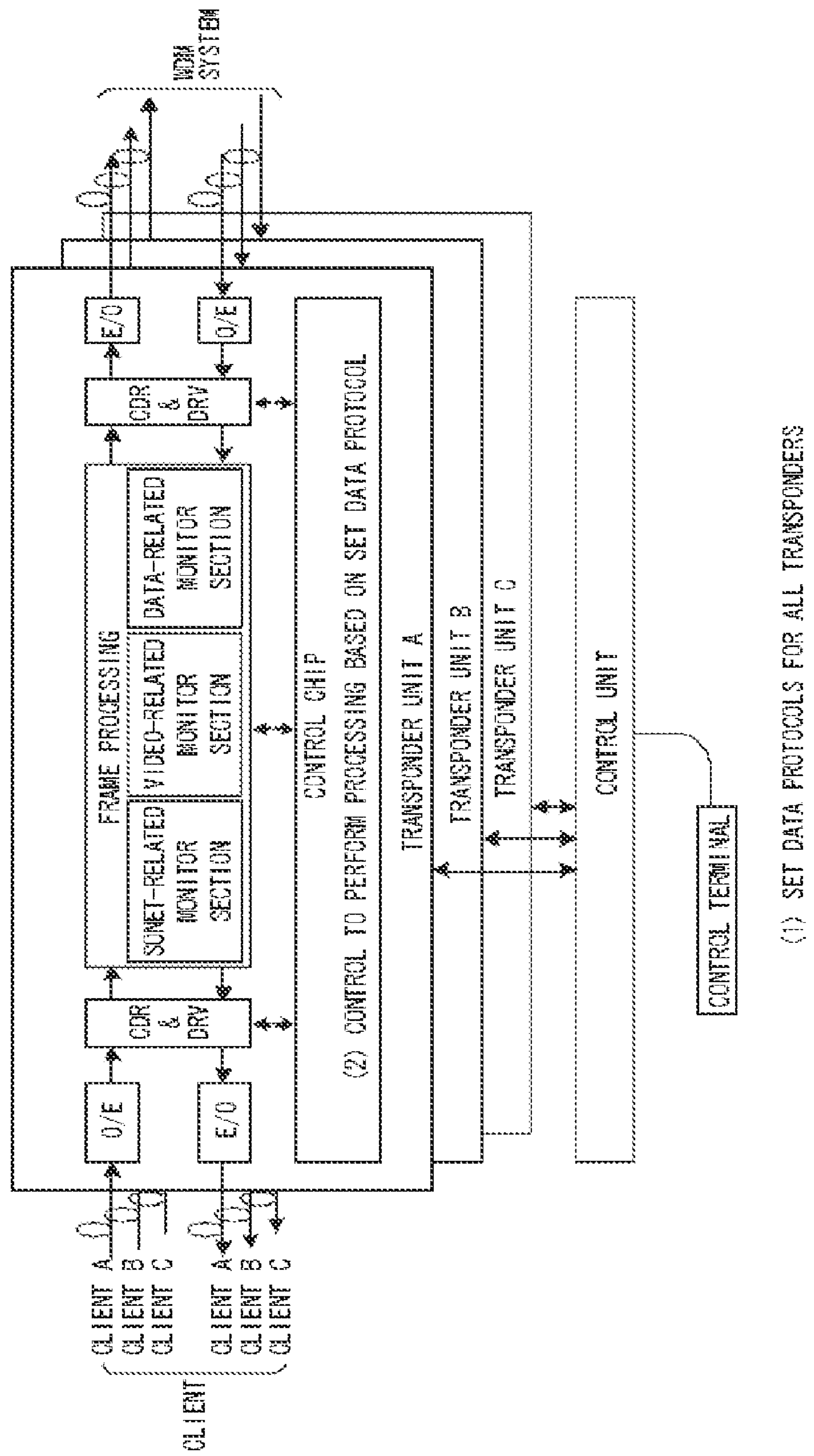
FIG. 11 is a diagram for explaining problems of a transponder unit according to conventional technologies.

Next, with reference to FIG. 9, the processing by the sampling method according to the second embodiment will be described. FIG. 9 is a flowchart showing processing by the sampling method according to the second embodiment.

The frequency instructing section 108*b* inputs the input signal to the sampling section 112 (operation S202) in response to a signal input to the client side OIL/E section 11 (Yes in operation S201). Then, the frequency instructing section 108*b* samples the input signal (operation S203). In other words, the frequency instructing section 108*b* instructs the sampling oscillating section 80 to output a sampling frequency to the sampling section 112 and instructs the sampling section 112 to sample the input signal (refer to (1) in FIG. 7A).

Then, the frequency instructing section 108*b* identifies the points of change (operation S204). In other words, the frequency instructing section 108 instructs the frequency calculating section 113 to identify the points of change from the obtained sampling result. Then, the frequency instructing section 108*b* calculates the point-of-change cycle frequency (operation S205). In other words, the frequency instructing section 108*b* instructs the frequency instructing section 108*b* to calculate the point-of-change cycle frequency from the obtained sampling frequency (such as 2 GHz) and the point of change (such as a cycle of 16). Then, the frequency instructing section 108*b* detects the synchronization frequency and also detects a synchronization frequency candidate (operation S206). Then, the frequency instructing section 10*b* instructs the frequency setting section 102 to define the client side oscillating section 30 to output the detected point-of-change cycle frequency (operation S207). Then, the client side oscillating section 30 outputs the set frequency (operation S208).

Then, the detecting section 109*b* determines whether the set frequency can be the synchronization frequency or not (operation S209). Here, if so (Yes in operation S209), the detecting section 109*b* detects the point-of-change cycle frequency (such as 125 MHz) as the synchronization frequency (operation S211). If not, on the other hand (No in operation S209), the detecting section 109*b* sets a harmonic (operation S210) and causes to output the set frequency and determines the synchronization in frequency (operation S208 to S209). In other words, the detecting section 109*b* causes the frequency instructing section 108*b* to calculate a harmonic of the point-of-change cycle frequency and causes to output the frequency from the client side oscillating section 30 and performs the determination again.

Then, the frame processing control section 110 performs frame processing based on the detected synchronization frequency and exits the processing (operation S212 to the end).

Effects of Second Embodiment

As described above, according to the second embodiment, the transponder unit samples an input signal by using a sampling frequency, identifies points of change from the sampling result, calculates the point-of-change cycle frequency from the value of the sampling frequency and the points of change, instructs an oscillating section to output the point-of-change cycle frequency, determines whether the point-of-change cycle frequency output from the oscillating section in response to the instruction and an input signal synchronize in frequency or not and, if so, detects the point-of-change cycle frequency as the synchronization frequency. If not, on the other hand, a harmonic of the point-of-change cycle frequency is set to the oscillating section through frequency instructing means, and whether the frequency synchronizes with an input signal or not is determined again. Therefore, the transponder unit can securely detect the frequency in synchronization with an input signal and can control operations. The transponder unit further can detect the synchronizing frequency accurately independent of the state of data (such as a series of multiple "1") at the sampled frequency. The transponder unit further can reduce the manual work for defining the data protocol to be used in a client.

Third Embodiment

Having described the transponder units according to the first and second embodiments above, embodiments may be implemented in various different forms excluding the embodiments above. A transponder unit according to a third embodiment in a different form will be described below.

Having described the first and second embodiments in which the processing section corresponding to each data protocol can operate at all times, embodiments are not limited thereto. After the setting relating to an input signal is performed, unnecessary processing sections may be terminated.

More specifically, a transponder unit may terminate a processing section, which is not necessary for the processing based on a synchronization frequency, in a case where a frame processing section is operated based on the synchronization frequency. For example, describing with reference to the example shown in FIG. 2, in a case where an input signal is SONET-related data and in a case where the frame processing section 40 is controlled by the frame processing control section 110 based on the setting corresponding to the SONET-related data, the data-related monitor section 42 and video-related monitor section 43 are terminated, which are unnecessary processing sections for the processing based on SONET-related data.

In this way, the transponder unit terminates an unnecessary processing section for the processing based on a synchronization frequency in a case where a frame processing section is operated based on the synchronization frequency. Therefore, the energy consumption by the transponder unit can be reduced, which can implement the processing with a higher energy efficiency.

Having described the first embodiment in a case where the transponder unit detects a synchronization frequency and also detects a synchronization frequency candidate, embodiments are not limited thereto. If the occurrence of an error is determined, a synchronization frequency may be detected again from the beginning. Having described the case where the occurrence of an error is monitored by the frame processing monitoring section 111 and processing ends if no synchronization frequency candidate is detected, embodiments are not limited thereto. A synchronization frequency may be detected again from the beginning.

The processing routines, control routines, specific names, information including data and parameters (such as FIG. 1, FIG. 2, FIG. 3, FIG. 4, FIG. 6, FIG. 7, FIG. 8, FIG. 9 and FIG. 10) may be changed arbitrarily unless otherwise noted.

The components of the shown apparatus are functionally conceptual and do not always have to be physically configured as shown. In other words, the specific forms of the distribution/unity of apparatus are not limited to those shown in the figures. All or a part of the shown components may be physically distributed or united functionally or physically in arbitrary units according to the various loads and state of use (for example, in FIG. 2, the frequency setting section 102 and the frequency instructing section 108 may be united, the state monitoring section 103 and the detecting section 109 may be united, the speed & frequency setting data section 106, the frame processing setting data section 107 and the frame processing control section 110 may be united, and the transponder unit 1 and the control section 100 may be separated). All or any part of the processing functions to be performed in the apparatus may be implemented by a CPU and programs to be analyzed and executed by the CPU or may be implemented as hardware based on Wired Logic.

Program for Transponder Unit

Having described the case where the processing is implemented by a hardware logic according to the first embodiment, embodiments are not limited thereto. The processing may be implemented by executing a prepared program in a computer. With reference to FIG. 10, an example of a computer that executes a transponder unit control program having the same functions as those of the transponder unit according to the first embodiment will be described. FIG. 10 is a diagram showing a program for the transponder unit according to the first embodiment.

As shown in FIG. 10, a transponder unit includes a client side E/O section 3001, a client side O/E section 3002, a client side CDR & DRV section 3003, a frame processing section 3004, a network side E/O section 3005, a network side O/E section 3006, a network side CDR & DRV section 3007, a CPU 3110, a ROM 3111, an HDD 3112 and a RAM 3113, which are connected via a bus 3008.

The ROM 3111 stores control programs that function the same as those of the frequency instructing section 108, the detecting section 109, the frame processing control section 110, and the frame processing monitoring section 111 according to the first embodiment. In other words, as shown in FIG. 10, the ROM 3111 prestores a frequency instruction program 3111*a*, a detection program 3111*b*, a frame processing control program 3111*c* and a frame processing monitoring program 3111*d*. Notably, these programs 3111*a* to 3111*d* may be united or separated as required, like the components of the transponder unit shown in FIG. 2.

The CPU 3110 loads and executes the programs 3111*a* to 311*d* from the ROM 3111 so that the programs 3111*a* to 3111*d* can function as a frequency instruction process 3110*a*, a detection process 3110*b*, a frame processing control process 3110*c* and a frame processing monitoring process 3110*d*, as shown in FIG. 10. The processes 3110*a* to 3110*d* correspond to the frequency instructing section 108, the detecting section 109, the frame processing control section 110 and the frame processing monitoring section 111, respectively, shown in FIG. 2.

The CPU 3110 further executes a transponder control program based on synchronization frequency data 3113*a* and supported frequency data 3113*b* stored in the RAM 3113.

It should be noted that the programs 3111*a* to 3111*d* according to this embodiment are not always required to store in the ROM from the beginning. For example, the programs may be stored in a "portable physical medium" such as a memory card, a flexible disk, a CD-ROM, an MO disk, a DVD, a magnetooptical disk and an IC card to be inserted to the transponder unit, a "fixed physical medium" such as an HDD internally or externally provided to the transponder unit or "other computer (or server)" connecting to the transponder unit over a public line, the Internet, a LAN or WAN, for example. Then, the transponder unit may load and execute the programs from the medium.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A transponder unit comprising:

a clock data recovery section that extracts clocks from an input signal;

an oscillator that can output various frequencies to the clock data recovery section;

a processor that is operative to instruct the oscillator to output a frequency, to determine whether the output frequency from the oscillating section and an input signal synchronize in frequency or not in response to the instructing, to detect a synchronization frequency, and to operate a frame processing based on the detected synchronization frequency.

2. The transponder unit according to claim 1, wherein the processor is operative to instruct the oscillator to sequentially output all frequencies that the oscillator can output, to determine whether all of the sequentially output frequencies in response to the instructing and an input signal synchronize in frequency or not, and to detect a frequency band for the synchronization and a center frequency in the frequency band for the synchronization as the synchronization frequency.

3. The transponder unit according to claim 2, wherein the processor is operative to detect a center frequency in a widest frequency band among detected multiple frequency bands as the synchronization frequency if multiple frequency bands for the synchronization are detected.

4. The transponder unit according to claim 1, wherein the processor is operative to sample an input signal by using a sampling frequency, to identify points of change from a sampling result, to calculate a point-of-change cycle frequency, which is a cycle of points of change, from the value of the sampling frequency and the points of change, and to instruct the oscillator to output the point-of-change cycle frequency, to determine whether the output point-of-change cycle frequency in response to the instructing and an input signal synchronize in frequency or not, and if the point-of-change cycle frequency and the input signal synchronize in frequency, the processor is operative to detect the point-of-change cycle frequency as the synchronization frequency; or if the point-of-change cycle frequency and the input signal do not synchronize in frequency, the processor is operative to define a harmonic of the point-of-change cycle frequency in the oscillator through the instructing, and to compare the harmonic and an input signal and to determine again whether their frequencies agree or not.

5. The transponder unit according to claim 1, further comprising a monitor that monitors whether the processing has any error or not after the frame processing starts operating under the control of the operating the frame processing, wherein the processor is operative to detect the synchronization frequency again if an occurrence of an error is determined by the monitor, and to operate the frame processing based on the detected synchronization frequency again.

6. The transponder unit according to claim 5, wherein the processor is operative to detect a synchronization frequency candidate with a higher possibility of being the synchronization frequency in order to detect the synchronization frequency and to detect the synchronization frequency candidate as the synchronization frequency, which is detected again, if the monitor determines the occurrence of an error.

7. The transponder unit according to claim 1, wherein the processor is operative to suspend a processing that is unnecessary for the processing based on the synchronization frequency in a case where the processor is operative to control the frame processing to operate based on the synchronization frequency.

8. A transponder unit control apparatus comprising:

a transponder unit having a clock data recovery circuit that extracts clocks from an input signal, an oscillator that can output various frequencies to the clock data recovery circuit, a processor that is operative to instruct the oscillator to output a frequency, to determine whether the output frequency and an input signal synchronize in frequency or not in response to the instructing, to detect a synchronization frequency, to operate a frame processing based on the detected synchronization frequency, and to control the transponder unit.

* * * * *